July 28, 1964　　　D. C. EMERSON　　　3,142,627
FUEL ELEMENT ASSEMBLIES
Filed Oct. 26, 1959　　　　　　　　　　6 Sheets-Sheet 3

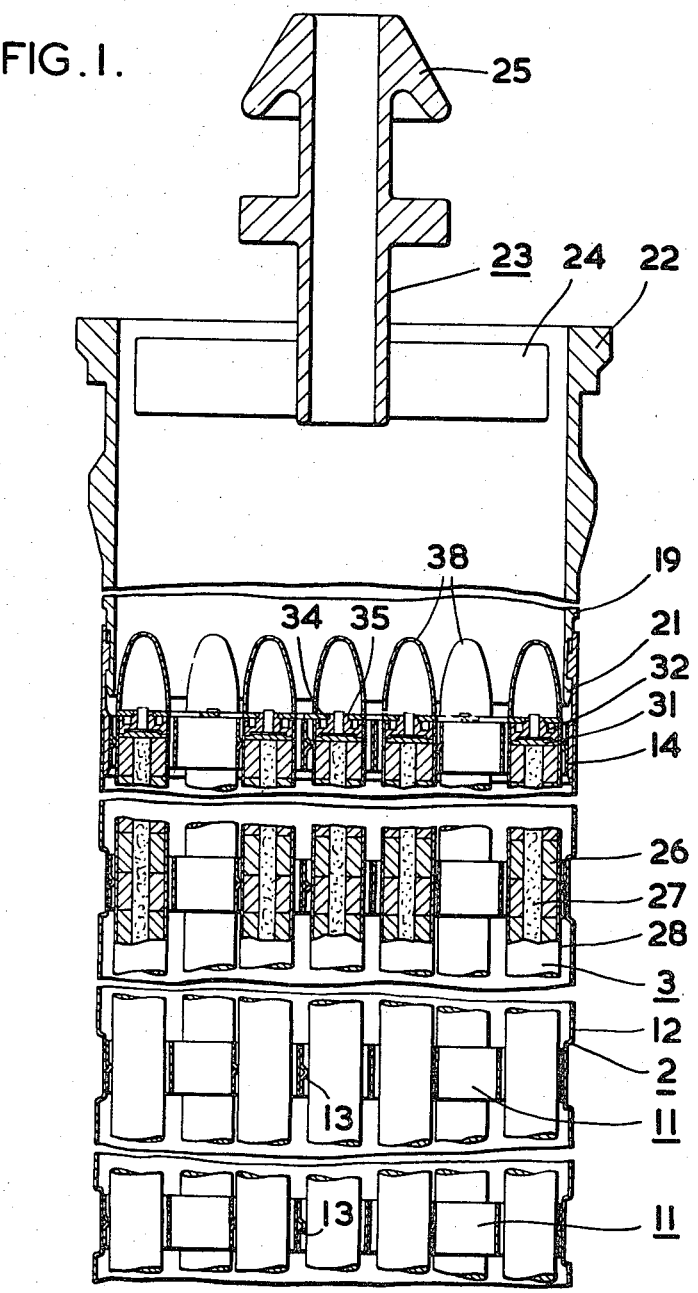

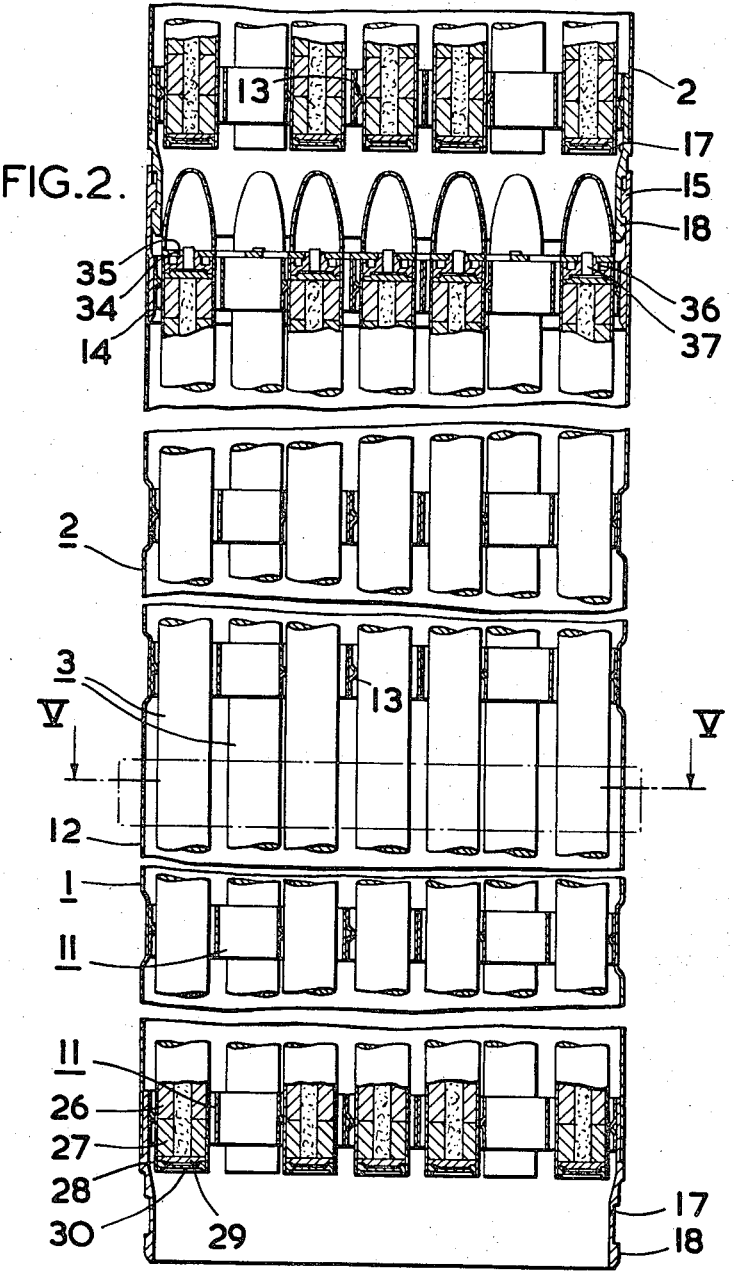

INVENTOR
DAVID COLIN EMERSON
BY
ATTORNEYS

July 28, 1964  D. C. EMERSON  3,142,627
FUEL ELEMENT ASSEMBLIES
Filed Oct. 26, 1959
6 Sheets-Sheet 4
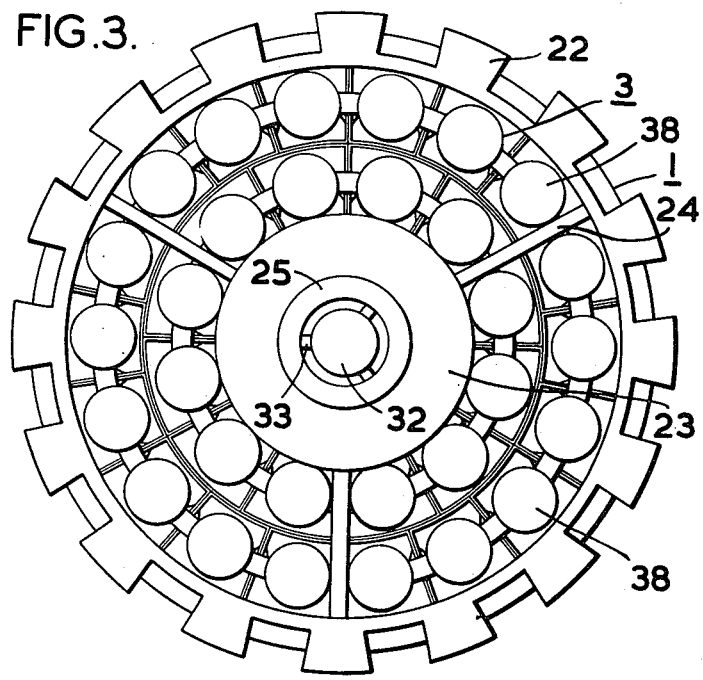
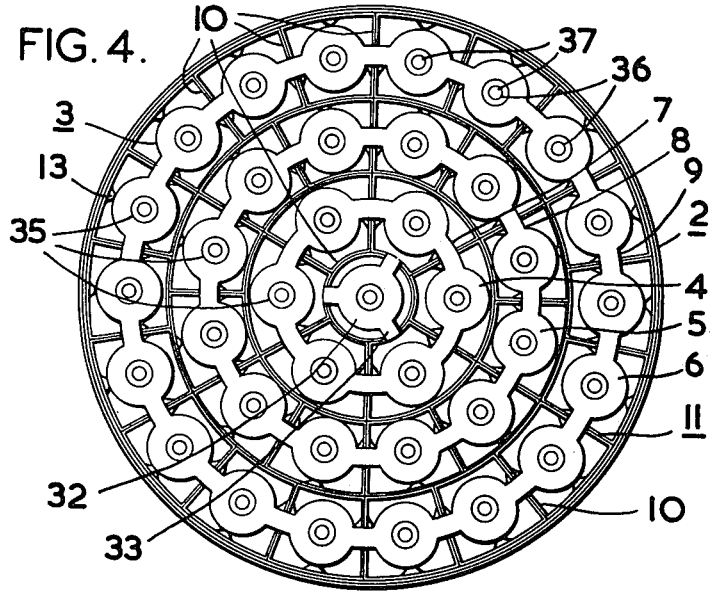
INVENTOR
DAVID COLIN EMERSON
BY
ATTORNEYS July 28, 1964  D. C. EMERSON  3,142,627
FUEL ELEMENT ASSEMBLIES
Filed Oct. 26, 1959  6 Sheets-Sheet 5

INVENTOR
DAVID COLIN EMERSON
BY
ATTORNEYS

July 28, 1964

D. C. EMERSON 3,142,627

FUEL ELEMENT ASSEMBLIES

Filed Oct. 26, 1959

INVENTOR
DAVID COLIN EMERSON

BY Lawson and Taylor
ATTORNEYS

United States Patent Office 3,142,627
Patented July 28, 1964

3,142,627
FUEL ELEMENT ASSEMBLIES
David Colin Emerson, Appleton, England, assignor to United Kingdom Atomic Energy Authority, London, England
Filed Oct. 26, 1959, Ser. No. 848,593
1 Claim. (Cl. 176—78)

This invention relates to fuel element assemblies for nuclear reactors, the assemblies being of the kind comprising a cluster of rod-like nuclear fuel elements.

The support of a number of thin rod-like nuclear fuel elements in a cluster poses a number of problems. The fuel elements must be accurately located, they must be retained closely in position relative to one another during their lifetime in the reactor, they must have reasonable freedom to expand with temperature changes, they should be stably supported (that is, any tendency to deflect should not create temperature changes which will cause yet further deflection), they should be free from chatter and vibration when subjected to cooling by a turbulent cooling fluid, and methods used for their support should not involve the use of excessive structural material which can influence the neutron economy and impede coolant flow.

The fuel element assembly according to the present invention has the characterising features that the fuel element rods are supported in tension from thin plates which in turn are supported on thin deep webs and are laterally stabilised by a further series of thin deep webs spaced at intervals along their length, the webs being provided with small lateral projections reaching to the walls of the fuel element rods.

The support of the rods in tension eliminates any risk of bowing due to compressive forces and hence the rods tend to be stable. The use of thin support plates in combination with thin deep webs for the tensile support of the rods introduces very little undesired impedence to coolant flow. The thin flat plates need be of only slightly greater size than the cross-section of the fuel elements. The repetition of the thin deep webs with lateral projections along the fuel assembly satisfy the requirements for location, freedom for expansion and avoidance of vibration and chatter at the same time offer very little impedence to coolant flow and have very small mass and hence can be made to have little interference with nuclear characteristics of the assembly.

An embodiment of the invention will now be described by way of example with reference to the accompanying drawings wherein:

FIGURE 1 is a fragmental side view in medial section of the upper half of a fuel element assembly including a fuel element cluster according to the invention.

FIGURE 2 is a fragmental side view of the lower half thereof.

FIGURE 3 is a plan view of the fuel element assembly.

FIGURE 4 is a plan view of the fuel element assembly shown in FIGURE 1 but with the stream-line caps on the upper ends of the fuel members removed for clarity.

Figure 2A:
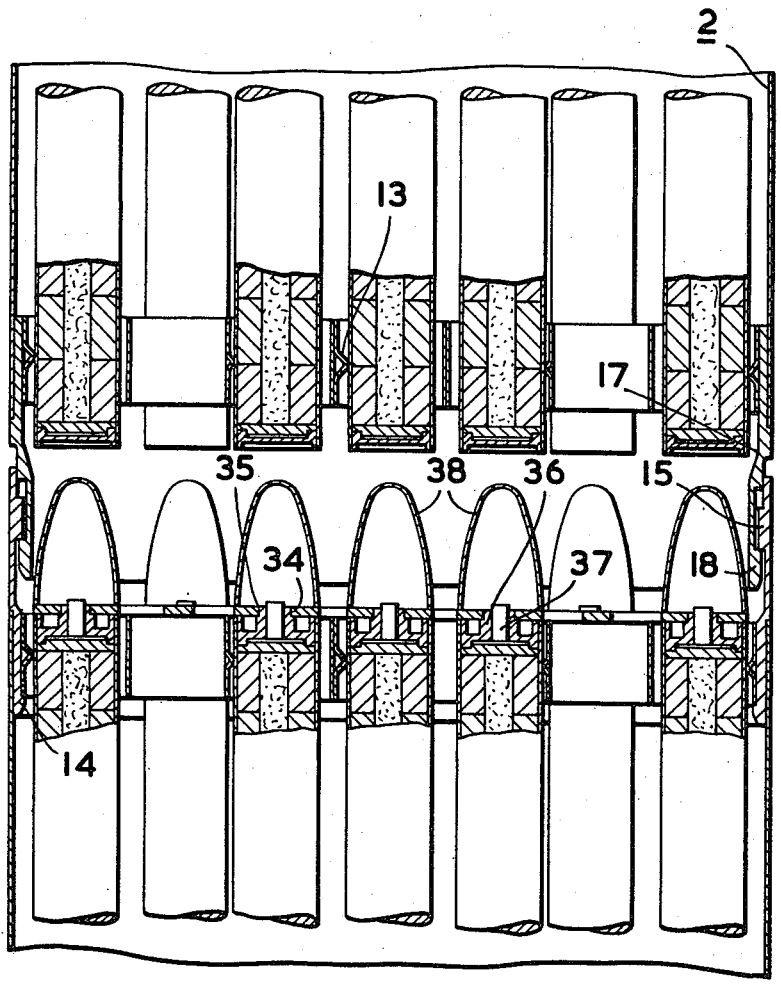
FIGURE 2A is an enlarged detail of the upper part of FIGURE 2.

Referring to FIGURES 1 to 4, the fuel element assembly 1 includes two inter-connected fuel units 2, each comprising thirty-seven individual rod-like fuel elements 3 arranged in a lattice consisting of a central fuel element, surrounded by a series of three concentric groups of fuel elements 4, 5 and 6 respectively. The fuel elements 3 of each of the groups 4, 5 and 6 are inter-connected by thin common support plates 7, 8 and 9 respectively, the plates being supported in turn by the cross-members 10 of thin fuel element-locating grids 11 of web-like form carried by the upper ends of the inner walls of sleeve members 12 housing the fuel elements 3.

Figure 6:
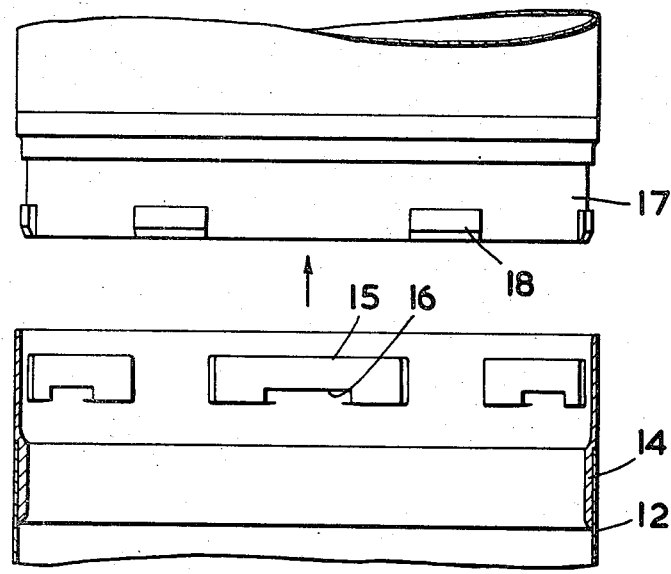
FIGURE 6 is a detail.

Further fuel element locating grids 11 are attached, at spaced intervals, to the inner walls of the sleeve members 12, the sides of the cross members 10 of each of the locating grids 11 being formed with projections 13 for centralising the fuel elements 3. A ring 14 supports each of the upper locating grids 11 and is attached to the upper inner walls of the respective sleeve member 12 by welding. The rings 14 are formed with internal splines 15 (see particularly FIGURE 6) the lower ends of which have recesses 16. A ring 17 is attached to the lower end of each sleeve member 12 and is formed with external splines 18 (see particularly FIGURE 6) for engagement with the recesses 16 of the splines 15. The fuel units 2 are inter-connected by passing the splines 18 of one unit between the splines 15 of other, rotating one unit relative to other until the splines 18 are aligned with the recesses 16 of the splines 15 then moving the units 2 slightly away from one another until the splines 18 engage with the recesses 16 of the splines 15. This arrangement of inter-connection allows a measure of articulation between the units 2 which is advantageous when loading fuel element assemblies in reactors in which the fuel element channels have become "bowed."

Figure 7:
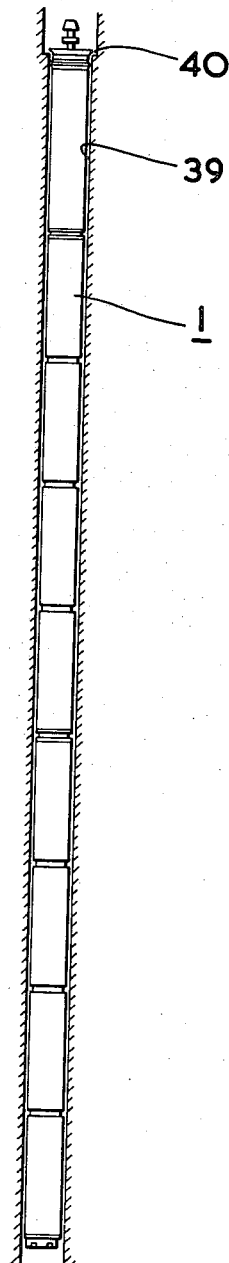
FIGURE 7 is a side view, to a reduced scale, of the complete fuel element assembly loaded in a reactor.

The inter-connected fuel units 2 shown are intended for a vertically-orientated reactor and are supported within the reactor coolant channels by a tubular support 19, the lower end of which is formed with internal splines 21 identical to the splines 18 of the ring 17 attached to each unit 2. The upper unit 2 is thus inter-connected to the support 19 in the same manner as the two units 2 are inter-connected. The upper end of the support 19 is formed with equi-spaced lugs 22 which rest upon an annular support in the upper end of a reactor fuel element channel. (FIGURE 7 shows a complete fuel element assembly 1 loaded in a fuel element channel 39 of a moderated reactor having an annular support ring 40 in the upper end thereof.) A spider 23 (FIGURES 1 and 2) having legs 24 attached to the upper inner walls of the support 19 is provided with a head 25 for lifting and lowering of the fuel element assembly 1.

Each fuel element 3 comprises a stack of hollow cylinders 26 of nuclear fuel reinforced by a heat-insulating filling 27 and enclosed in a thin sheath 28. An insulating disc 29 spaces a lower end cap 30 from the cylinders 26 and a further disc 31 similarly spaces an upper end cap 32. Preferably the cylinders 26 are of $UO_2$, the fillings 27 and discs 29, 31 are of magnesium oxide and the end caps 30, 32 and sheath 28 of stainless steel. The end caps 30, 32 are sealed to the sheath 28 as by welding.

The upper end cap 32 of each central fuel member 3 has three equi-spaced projections 33 (FIGURE 4) which bear upon the upper edges of the central cross-members 10 of the upper locating grids 11. The upper end caps 32 of the fuel members 3 in the concentric groups 4, 5 and 6 have shoulder portions 34 (FIGURES 1 and 2) which engage with apertures 35 in their respective support plates 7, 8, 9 and are welded thereto. Thus all the fuel elements 3 are suspended from the upper locating grids 11. This arrangement provides a simple method of supporting the fuel elements with the minimum of material. The upper end caps 32 of all the fuel elements 3 have holes 36 for evacuation and purging operations during the final stages of manufacture of the fuel elements, the holes 36 then being closed by sealing pins 37.

The fuel element assembly 1 is intended to be cooled by a flow of coolant in a downward direction, the upper end of each fuel element 3 being provided with a streamlined cap 38 to smooth out coolant flow with a minimum of turbulence. The caps 38 for the central fuel elements 3 are welded directly to their respective end caps 32 whilst the remainder of the fuel elements 3 have their caps 38 similarly attached to their respective support plates 7, 8 or 9.

Figure 5:
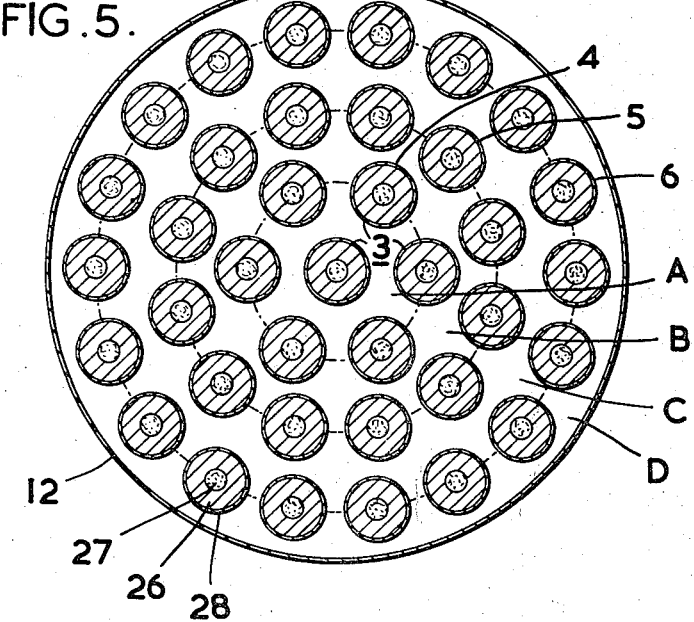
FIGURE 5 is a plan view of the box V—V outlined in dot-and-dash lines on FIGURE 2.

The spacing of the fuel elements 3 is such that the coolant free-flow cross-section per fuel member increases progressively from the centre of the lattice to the boundary thereof. Referring to FIGURE 5, the lattice of fuel elements 3 may be considered as being divided into four individual coolant zones, namely zones A, B, C and D respectively. Zone B provides a greater free-flow cross-section for coolant (per fuel member) than zone A, zone C is similarly greater than zone B, and zone D similarly greater than zone C. Typically, groups 4, 5 and 6 of the fuel members 3 are of 1.37 ins., 2.5 ins. and 3.75 ins. pitch-circle-diameters respectively, the internal diameter of the sleeve members 12 is 4.5 in. and the external diameters of the fuel members 3.5 ins. Calculating the overall cross-sectional areas of that portion of the fuel members 3 within the respective zones, the free flow cross-sectional area for coolant per fuel member in zones A, B, C and D are .065 in.$^2$, .33 in.$^2$, .52 in.$^2$ and .77 in.$^2$ respectively. When the fuel element assembly 1 is loaded in a reactor coolant channel and surrounded by a moderator, the neutron capture rate (and thus the heat generation rate) of the fuel elements 3 varies across the lattice, being a maximum in the group 6, i.e., the fuel elements 3 nearest the moderator, to reach a minimum in the centre fuel element 3. Thus the coolant free-flow cross-section available for each fuel element 3 may be made to vary according to the heat generation rate of the particular fuel elements to give a substantially uniform transfer of heat across the lattice.

What is claimed is:

A nuclear reactor fuel assembly for upright disposal in a nuclear reactor and comprising a sleeve, grids of intersecting webs spanning the sleeve and orientated edgewise with respect to vertical coolant flow through said sleeve, the grids being attached at intervals along the length of the inner wall of the sleeve and aligned with one another to define a lattice of aligned apertures, a plurality of support plates resting on the webs of the uppermost one of said grids in said sleeve, each support plate being secured to the upper end only of a group of sheathed nuclear fuel rods extending through a group of said aligned apertures with clearance between rods and grids, the lower ends of said fuel rods being free for individual longitudinal movement, the support plates having dimensions permitting coolant flow through said uppermost grid and around the support plates, and small lateral projections from the intersecting webs of the grids reaching to the sheathed nuclear fuel rods to locate the rods in their apertures.

References Cited in the file of this patent

UNITED STATES PATENTS

| | | |
|---|---|---|
| 2,708,656 | Fermi | May 17, 1955 |
| 2,773,823 | Goett | Dec. 11, 1956 |
| 2,832,733 | Szilard | Apr. 29, 1958 |
| 2,879,216 | Hurwitz et al. | Mar. 24, 1959 |
| 2,938,848 | Ladd et al. | May 31, 1960 |
| 2,948,517 | Cosner | Aug. 9, 1960 |
| 2,977,297 | Evans et al. | Mar. 28, 1961 |
| 2,986,509 | Duffy | May 30, 1961 |
| 2,999,059 | Treshow | Sept. 5, 1961 |
| 3,068,163 | Currier et al. | Dec. 11, 1962 |

OTHER REFERENCES

GER–1301, A Design Description of the Dresden Nuclear Power Station, November 1956, pages 12 and 13.

TID–7559 (Part 1), Fuel Elements Conference, May 1958, pages 185–188 and 194–198.